June 24, 1941.  W. B. MARSHALL  2,246,805
SELF-CLEANING BEARING
Filed Oct. 27, 1939

William B. Marshall
INVENTOR.

BY George A. Evans
ATTORNEY.

Patented June 24, 1941

2,246,805

UNITED STATES PATENT OFFICE 2,246,805

SELF-CLEANING BEARING

William B. Marshall, Milwaukee, Wis., assignor to Chain Belt Company, Milwaukee, Wis., a corporation of Wisconsin Application October 27, 1939, Serial No. 301,564

3 Claims. (Cl. 308—36.3)

This invention relates to bearings and particularly to bearings such as are used for journalling tail shafts on screw conveyors handling abrasive material in liquids. To prevent such material from getting into the bearing surface, various expedients have been employed such as the provision of stuffing boxes between the shaft of the conveyor and its box or cabinet, the bearings being located outside the box. One of the principal objections to this arrangement is the requirement of almost constant attention in adjusting and taking up the glands to prevent leakage. Other objections are initial cost and the increase in over-all length of the conveyor.

It is an object of the present invention to provide a bearing for such shafts which may be economical to manufacture and which will provide automatic cleaning of the bearing member in the bearing housing. In this manner excessive wear promoted by abrasive material entering the bearing is prevented, longer life is obtained and constant attention and adjustment is not required.

In accomplishing the objects of the invention my preferred embodiment includes a readily replaceable, cone-shaped member rotatable with the conveyor shaft, but free to move axially thereof, which member is maintained in close contact with a complementary cone-shaped bearing surface on the interior of the housing. It is contemplated that the shaft may be inclined or even vertical, in which cases the cone-shaped member may be maintained in seating position by its own weight, but where gravity is insufficient, positive pressural means may be employed to maintain such relationship, an illustration of which will be described herewith.

The invention contemplates the combination of a structure of this type with means for flushing the bearing to assist in preventing gritty material from entering directly into the bearing and the provision of sealing means to prevent such material from working into the space between the end of the shaft and the slideable, self-seating member.

The bearing here described is intended only as a radial bearing the axial thrust being taken up at the head of the shaft, not shown. Consequently the co-acting bearing surfaces may be conical without danger of locking or excessive wear.

Figure 1:
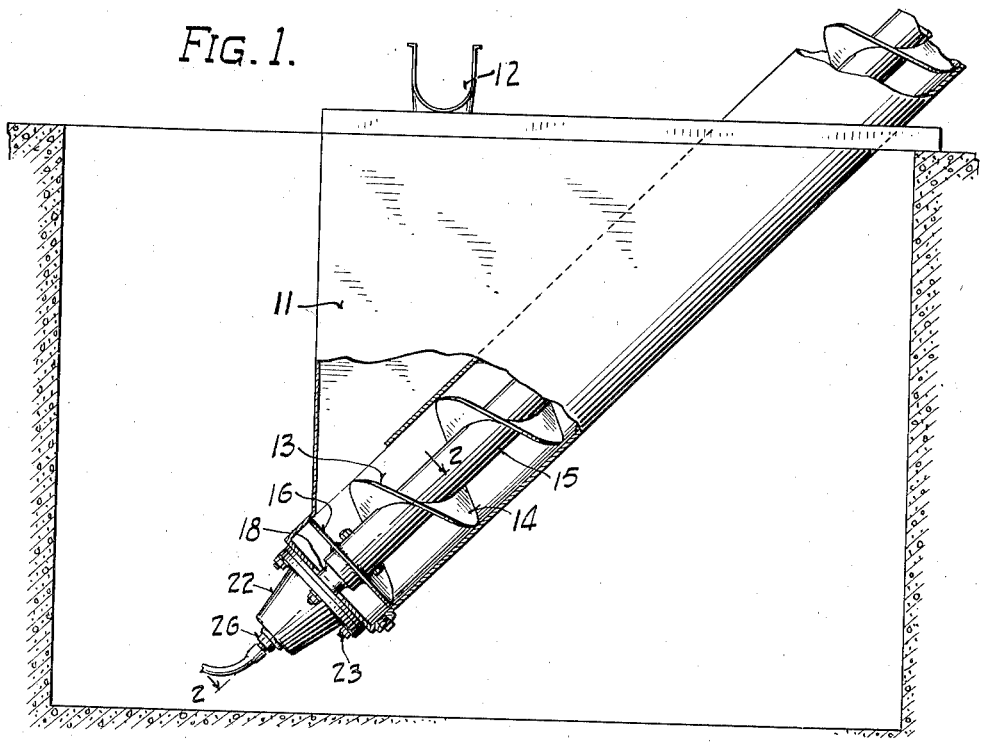
Figure 2:
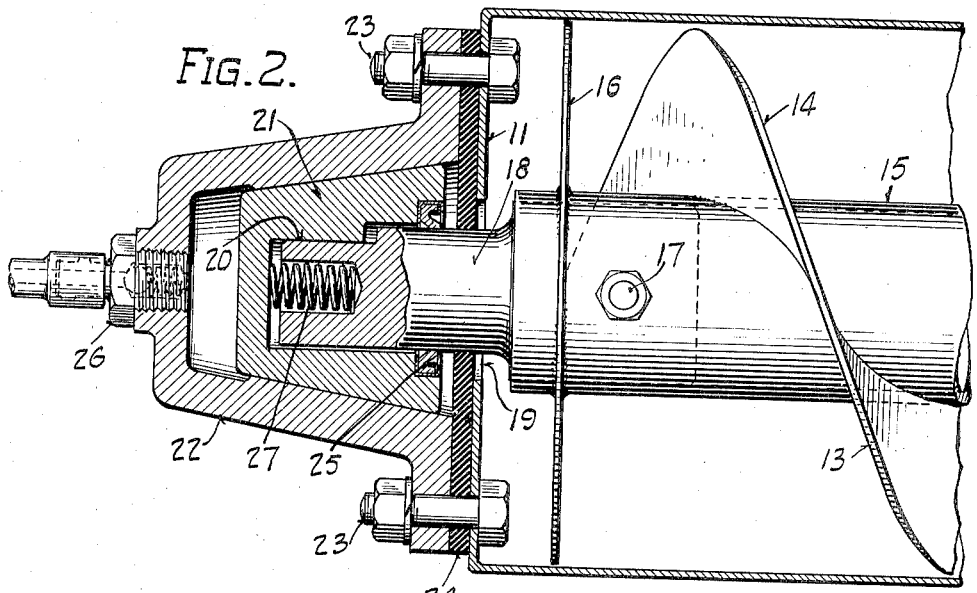

One embodiment of the invention is illustrated in the accompanying drawing in which:

Figure 1 is a side elevation, partly in section, of a grit washer employing an inclined screw conveyor, and, Figure 2 is section taken on the line 2—2 of Figure 1.

A suitable use for the bearing here disclosed is in connection with a screw conveyor of apparatus for washing grit recovered in the treatment of sewage, this use being illustrated by the device shown in the drawing. In such apparatus the grit is passed into the washing chamber 11 from a trough 12, and after it has settled, it is propelled by the screw 13 up the inclined bottom of the chamber to a point above and removed from the washing zone. The upper end of the screw conveyor and the methor of journalling it is not shown as it is conventional. As previously stated, axial thrust caused by the inclined shaft is entirely taken by the bearing at the head of the conveyor. Liquid which contains organic matter freed from the grit during rotation of the screw is removed by any suitable means at the top of the cabinet 11.

A flight 14 is welded or otherwise attached to a hollow shaft 15 to form the screw conveyor shown. At the lower end of the flight 14 there is a circumferential flange 16 rigidly secured to the shaft 15 and abutting the end of the flight. The position of this flange, at right angles to the shaft, prevents most of the grit from reaching the bearing, but as some clearance must be provided between the perimeter of the flange and the housing 11 to permit the flange to freely rotate, this arrangement may not be considered a perfect seal.

Inserted a short distance into the hollow shaft 15 and rigidly secured thereto by bolts 17 is a solid plug or tail shaft 18, which extends beyond the end of the shaft 15 through an opening 19 in the housing 11. A flat portion 20 is provided at the outer end of the plug 18 to engage a corresponding flat portion provided on the inside of a cone-shaped member or bushing 21 enclosing the end of the tail shaft and slideably mounted thereon.

A flanged bearing housing 22 is secured by bolts 23 to the lower corner of the cabinet 11, the end wall of the cabinet at this point being transverse to the shaft of the screw conveyor. The inside of housing 22 is cone-shaped complementary to the exterior surface of the member 21 to provide a bearing surface, the side wall converging toward the outer end of the tail shaft. A gasket 24 is inserted between the housing 22 and the box 11 to prevent leakage, this gasket fitting closely around the shaft 18.

Between the shaft 18 and the inner end of the member 21 there is a seal 25 which prevents grit from working into the surfaces between these elements. Clearance is provided between the outer or closed end of the member 21 and the closed end of the housing 22 in order that the former may be free to move to the left, as shown on the drawing, to reseat itself as wear occurs in the bearing.

Communicating with the space between the cone-shaped bearing members is a fitting 26 through which liquid may be forced to flush out any material which may enter the bearing. By providing a slidable, cone shaped member, flushing of the bearing is considerably facilitated and localized areas of wear are compensated for by the self-seating construction.

To take care of such wear as will result in the bearings, the cone shaped member 21 is free to slide axially of the shaft to seat itself. Where the shaft is inclined, gravity alone may provide sufficient force to maintain a close bearing fit, but where the force of gravity is insufficient, pressural means, such as spring 27, may be employed to maintain this relationship. In Fig. 2 a coil spring 27 is shown disposed in a recess in the end of the shaft 18 with its outer end exerting pressure against the inside of the cone shaped member 21. Spring 27 maintains the cone-shaped bearing members 21 and 22 in proper seating engagement, thus preventing grit from entering therein and automatically taking up any clearance which may have resulted from wear.

One of the principal advantages of the present invention is the ease with which the bearing may be removed, surfaces reground or elements replaced. In apparatus such as is shown in Fig. 1, the grit washer 11 is hung in a pit in which there is ample clearance for access to remove the housing 22 and replace the member 21. Under this arrangement, there is no wear on the conveyor shaft and the only replacements are the housing and plug which may easily be removed from the outside. Because the housing 22 is sealed tightly to the rest of the grit washer, there can be no leakage around the shaft, a very desirable feature when grit, being washed, contains sewage or other matter of a putrescible nature.

It is to be understood that the invention is not to be limited to any particular form or arrangement of parts except insofar as such limitations are included in the appended claims.

What is claimed is:

1. In a receptacle for liquids containing gritty materials, an internally-tapered bearing housing attached to said container and being closed at one end, a rotatable shaft extending into said housing, a bushing slidably mounted on said shaft having an external surface tapered complementary to the internal surface of said housing and being closed at one end, means extending through said housing for introducing liquid between said housing and said bushing into said receptacle and yieldable means urging said bushing into seating relation with respect to said housing.

2. In a receptacle for liquids containing abrasive materials, a closed housing having an internal cone shaped surface attached to one side of said receptacle, a rotatable shaft extending into said housing, a bushing fitted on said shaft, free to slide axially thereon, said bushing having a conical outer surface complementary to the internal surface of said housing to form a submerged bearing therewith, means supplying liquid under pressure between said housing and said bushing and yieldable means urging said bushing into bearing contact with said housing.

3. In combination with a receptacle containing gritty materials and a rotary shaft, a closed-bearing housing attached to said receptacle and arranged to contain one end of said shaft, said housing having an internal cone shaped bearing surface, a cone shaped bushing slidable axially of said shaft and enclosing one end thereof, said bushing forming a bearing fit within said housing, a fitting for introducing liquid into said housing to flush said bearing, yieldable means urging said bushing into bearing contact with said housing and a seal between said bushing and said shaft.

WILLIAM B. MARSHALL.